United States Patent [19]
Hilstolsky

[11] Patent Number: 5,263,595
[45] Date of Patent: Nov. 23, 1993

[54] MODULAR RACK SYSTEM FOR USE WITH REMOVABLE PANS

[75] Inventor: Frank J. Hilstolsky, Dallas, Pa.

[73] Assignee: Metro Industries, Inc.

[21] Appl. No.: 774,356

[22] Filed: Oct. 10, 1991

[51] Int. Cl.⁵ ............................................. A47F 5/00
[52] U.S. Cl. ................................. 211/126; 211/181; 211/133
[58] Field of Search ................ 211/126, 181, 133, 187

[56] References Cited

U.S. PATENT DOCUMENTS

| | | | |
|---|---|---|---|
| 2,936,077 | 5/1960 | Carpenter | 211/126 |
| 2,959,298 | 11/1960 | Pope | 211/126 |
| 3,138,123 | 6/1964 | Maslow | 108/159 |
| 3,208,408 | 9/1965 | Maslow | 108/148 |
| 3,225,720 | 12/1965 | Maslow | 211/181 X |
| 3,232,442 | 2/1966 | Wilson | 211/181 X |
| 3,252,434 | 5/1966 | Young | 211/181 X |
| 3,316,864 | 5/1967 | Maslow | 108/148 |
| 3,523,508 | 8/1970 | Maslow | 108/144 |
| 3,523,694 | 8/1970 | Oliver | 211/126 X |
| 3,610,429 | 10/1971 | Mackay | 211/133 |
| 3,757,705 | 9/1973 | Maslow | 108/144 |
| 4,004,819 | 1/1977 | Brongo | 280/79.3 |
| 4,629,077 | 12/1686 | Niblock | 211/187 |
| 4,725,066 | 2/1988 | Nootenboom et al. | 211/126 X |
| 4,811,670 | 3/1989 | Kolvites et al. | 108/107 |
| 4,892,044 | 1/1990 | Welsch | 108/154 |
| 4,964,350 | 10/1990 | Kolvites et al. | 108/110 |
| 4,989,519 | 2/1991 | Welsch et al. | 108/111 |

Primary Examiner—Robert W. Gibson, Jr.
Attorney, Agent, or Firm—Fitzpatrick, Cella, Harper & Scinto

[57] ABSTRACT

A rack system includes a horizontal polygonal base frame assembly and an identical horizontal top frame assembly, and a pair of vertical support assemblies, all fabricated from formed wire. The vertical support assemblies include three vertical rods at either end disposed in two planes and a plurality of horizontal support brackets or rails welded thereto at spaced intervals. The vertical rods are positioned such that projecting end portions thereof engage rib and cross brace portions of the base and top frame assemblies to form an interference or friction fit. When so positioned, the vertical support structure is restricted from moving in two perpendicular directions. The two vertical support assemblies are positioned in mirror-image relationship between the base frame assembly and the top frame assembly. The base and top frame assemblies with the two vertical support structures are secured and precluded from moving in a third direction by the interaction of the support posts and top and bottom frame assemblies.

36 Claims, 7 Drawing Sheets

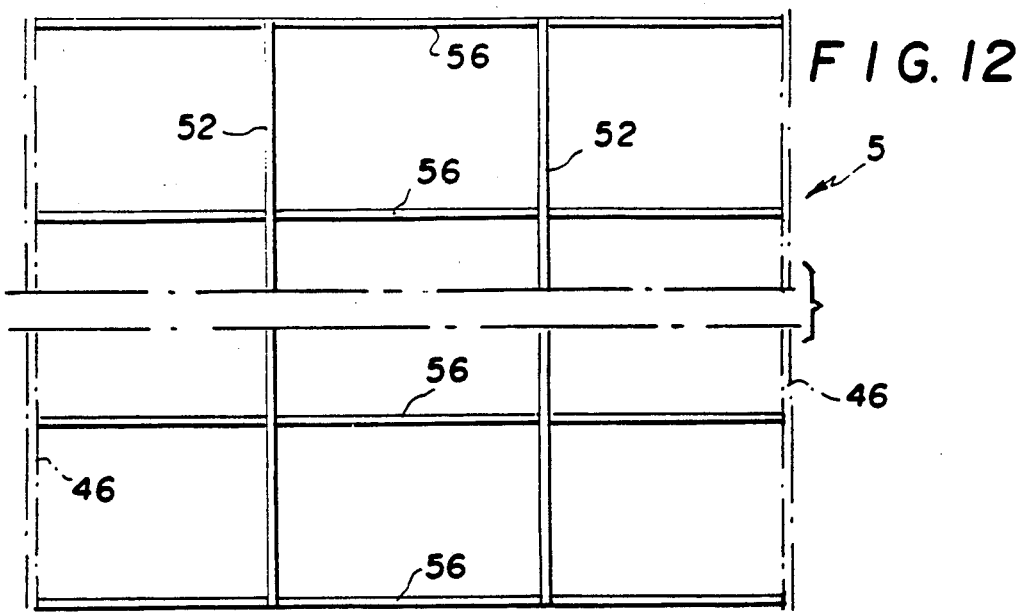
FIG. 12
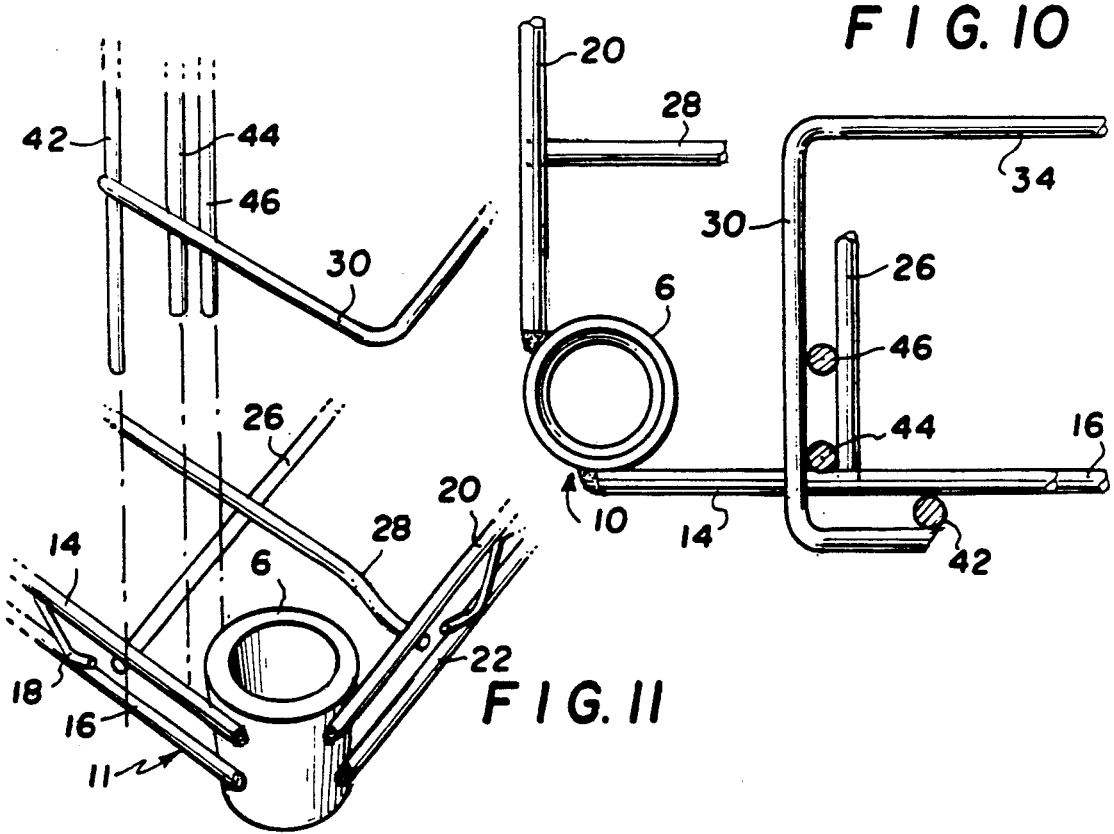
FIG. 10
FIG. 11

FIG. 13
FIG. 14
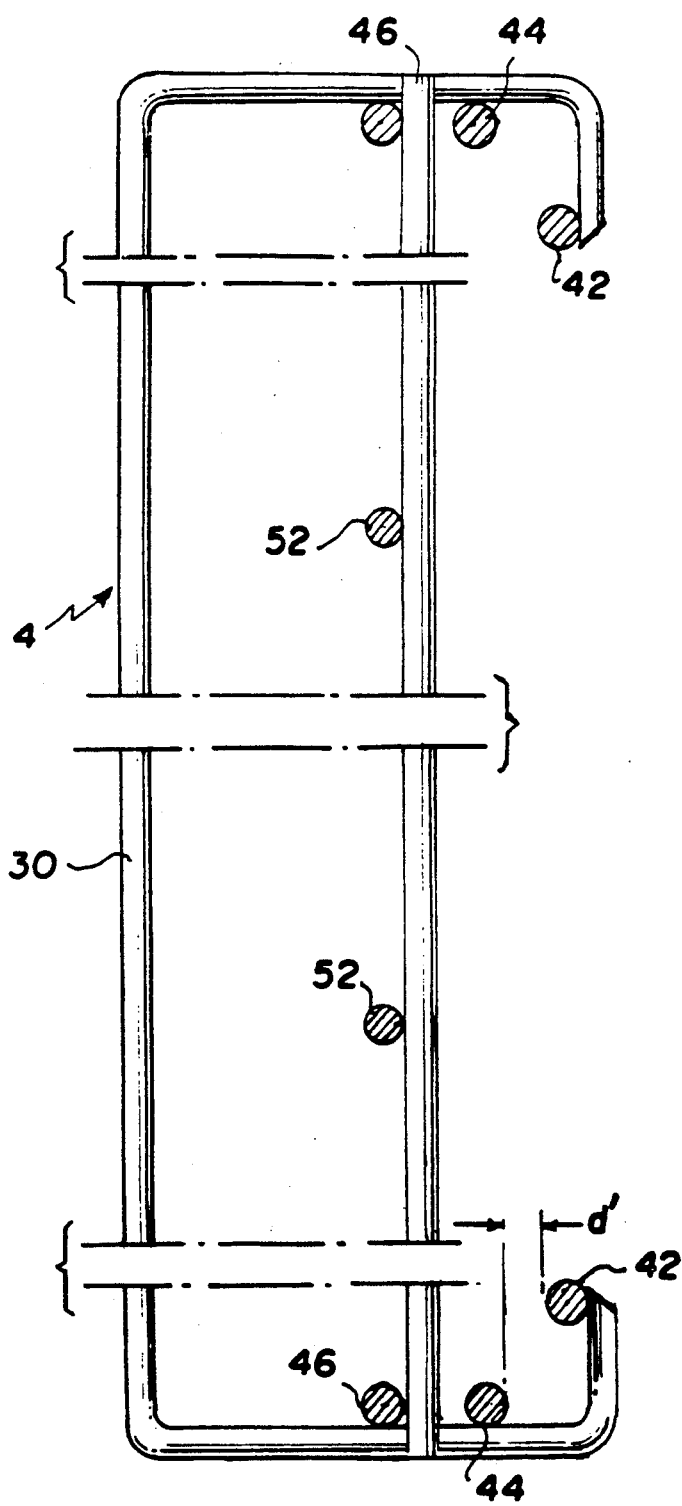
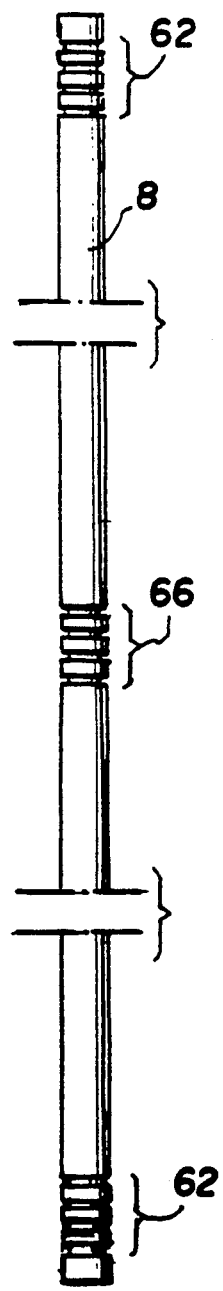

MODULAR RACK SYSTEM FOR USE WITH REMOVABLE PANS

BACKGROUND OF THE INVENTION

1. Field of the Invention

The present invention relates generally to modular rack systems. More particularly, the present invention relates to an improved "knockdown" modular, vertical, formed-wire rack system, which is especially well suited for commercial use with conventional removable pans for holding items, such as commercial bakery products, and which may be readily assembled and disassembled without tools to facilitate shipping, storing, and cleaning.

Although the rack system of the present invention is especially well-suited for use with removable pans for holding baking products in the food service industries, it can be used with equal advantage in combination with a variety of generally flat trays or the like, in many other commercial, industrial and residential applications and environments.

2. Description of the Prior Art

Modular shelving systems are well known. For example, U.S. Pat. Nos. 3,138,123 (Maslow) and 3,208,408 (Maslow) disclose knockdown shelving units that have achieved great commercial success under the trademark ERECTA SHELF of Applicant's Assignee, InterMetro Industries Corporation.

U.S. Pat. No. 3,523,508 (Maslow) discloses a modular adjustable shelving system that has also achieved great commercial success under InterMetro Industries' trademark SUPER ERECTA SHELF. This system comprises a formed-wire shelf component having a frusto-conically-shaped collar at each corner for receiving a support post. Each collar tapers outwardly toward its lower extremity when viewed in normal use. Generally cylindrical support posts, each having a plurality of uniformly spaced annular grooves formed in its outer surface, are secured to the shelf by means of a mounting assembly. Each mounting assembly comprises at least two separate, complementary, conical-shaped mounting members which are joined about and at least partially surround the support posts to define a sleeve. The outer surface of each sleeve is frusto-conically shaped and its inner surface is generally shaped as a right, circular cylinder. Thus, the mounting member is thickest at its bottom. The sleeves are sized to fit snugly within the shelf collars. A rib formed on an inside surface of each sleeve is sized to engage the grooves formed in the support post.

In use, sleeves are first placed about each support post such that the rib formed on the inside surface of each sleeve engages an appropriate groove in the support post at the desired height. The support posts with the sleeves mounted thereon are then each passed through one respective collar at a corner of each shelf. The collars, sleeves, and posts firmly engage each other due to their relative respective sizes. When all support posts are inserted, the shelving system is placed in position and is ready for use. As the load on the shelf increases, a radially-inwardly directed force between the collars and sleeves brings the sleeves into locking relation with the posts due to the wedging action between the collars and sleeves.

U.S. Pat. No. 3,757,705 (Maslow) discloses an adjustable shelving system similar to U.S. Pat. No. 3,523,508. Other examples of known shelving systems are disclosed in U.S. Pat. Nos. 3,316,864 (Maslow); U.S. Pat. Nos. 4,629,077 (Niblock); 4,799,818 (Sudimak, et al.); 4,811,670 (Kolvites, et al.); 4,892,044 (Welsch); 4,964,350 (Kolvites, et al.); and 4,989,519 (Welsch, et al.).

Although the foregoing shelving systems are well suited for many varied applications, there is a need for a formed-wire modular knock-down rack system using the structural principles, for example, of the Maslow or Kolvites Patents, but that also is particularly well adapted for use in the baking industry. Such a rack system should allow baked products such as bread, buns, rolls, and the like, to be removed from the oven, still hot and on their baking pans, and to be supported by the rack system. Individual pans could be inserted and removed from the rack system as required. Ideally, the rack system should be constructed to be as open as possible to allow for maximum ventilation so that freshly baked products can quickly cool to room temperature for further handling as need be. Moreover, the open construction of the rack system should minimize the surface area of the rack system thereby facilitating cleaning and maintaining sanitary conditions. Further, the rack system should be fabricated from materials which are not adversely affected by high temperatures and which resist corrosion and contamination by food particles, dust, and the like.

U.S. Pat. No. 4,004,819 (Brongo) discloses a mobile truck having removable racks for pans, trays and the like that achieves many of the objectives noted above but may not be completely and easily knocked down for shipment and storage as is desirable. Therefore, still further improvements are possible.

SUMMARY OF THE INVENTION

It is an object of the present invention to improve upon the structural concepts of the modular shelving systems known in the prior art and adapt such improvements particularly to modular rack systems.

It is another object of the present invention to provide an inexpensive, knockdown, modular rack system that can be readily assembled and disassembled with minimal effort and without tools yet still has high strength, stability, and rigidity.

It is still another object of the present invention to provide a substantially open, formed-wire rack system which is aesthetically pleasing, simply fabricated, stable in use, corrosion-resistant and readily cleaned.

It is another object of the present invention to provide an inexpensive, formed-wire rack system that is adapted to removably support a plurality of conventional baking pans which can be individually inserted and removed.

In a preferred embodiment the invention is a rack system that includes a horizontal base frame assembly, a horizontal top frame assembly, and a pair of opposed vertical support assemblies. Each vertical support assembly comprises a plurality of spaced vertical support rods and a plurality of spaced horizontal support brackets or rails secured to the vertical support rods at points where they intersect each other. At least two of the vertical support rods engage and interlock with the base frame assembly and the top frame assembly such that each vertical support assembly is restricted from movement relative to said base frame assembly and the top frame assembly in first and second directions. The plurality of support brackets are arranged in substantially co-planar facing pairs to support a removable pan between the pair of vertical support assemblies.

In accordance with further features of the preferred embodiment, the invention pertains to a rack system that includes a horizontal base frame assembly, a horizontal top frame assembly, a pair of opposed vertical support assemblies, and a plurality of support posts. Each vertical support assembly includes a plurality of spaced support rods and a plurality of spaced support brackets secured to the support rods at the points where they intersect each other. At least two of the support rods engage and interlock with the base frame assembly and the top frame assembly such that each vertical support assembly is restricted from movement relative to the base frame assembly and the top frame assembly in first and second directions. The plurality of support posts are disposed between and removably secured to the base frame assembly and the top frame assembly so as to further restrict relative movement therebetween. The plurality of support brackets are arranged in substantially co-planar facing pairs to support a removable pan between the pair of vertical support assemblies.

A more complete appreciation along with an understanding of other aspects, objects, features, and advantages of the present invention will become apparent from the following detailed description, when considered in conjunction with the accompanying drawings.

BRIEF DESCRIPTION OF THE DRAWING

FIG. 10 is a fragmented, partial-sectional, top plan view illustrating the positional relationship of the frame assembly shown in FIG. 4, and the support rack shown in FIG. 9.

FIG. 11 is a fragmented, perspective view showing the positional relationship of the frame assembly depicted in FIG. 4, and the support rack shown in FIG. 9.

FIG. 12 is a vertical elevational view of a pan stop assembly used with the support rack shown in FIG. 9 which in combination form the vertical support assembly of the rack system shown in FIG. 1.

FIG. 13 is a fragmented, partial-sectional top plan view of the pan stop assembly shown in FIG. 12 connected to the support rack shown in FIG. 9.

FIG. 14 is a fragmented, elevational view of a support post used in the rack system shown in FIG. 1.

DETAILED DESCRIPTION OF THE PREFERRED EMBODIMENTS

Initially, for purposes of explanation, the attitude and location of components of the rack system of the present invention will be defined with reference to a fully assembled system when viewed in normal use. Accordingly, the term "horizontal" refers to a direction parallel to a surface on which the fully assembled rack system is supported in normal use. Similarly, the term "vertical" refers to a direction substantially perpendicular to the horizontal direction. "Base" refers to the end of the rack system closest to the surface on which the rack system is supported, and "top" refers to the opposite end. The "front" and "rear", "left side" and "right side" of the rack system are relative terms as will be defined below.

Figure 1:
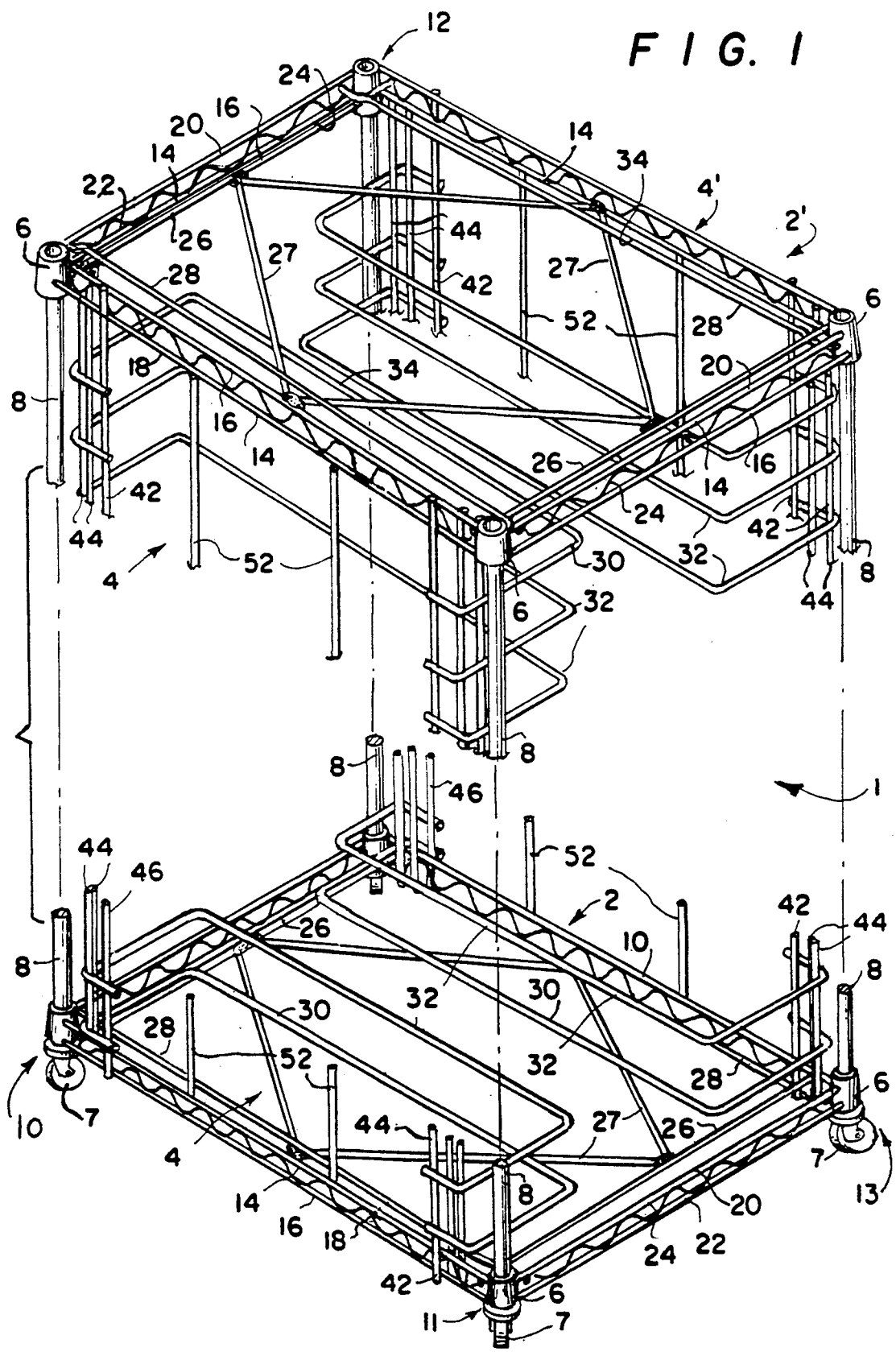
FIG. 1 is a fragmented, perspective view of an assembled modular rack system for use with removable pans, constructed in accordance with a preferred embodiment of the present invention.

FIG. 1 illustrates a preferred embodiment of the rack system 1. For purposes of explanation, reference numerals 10, 11, 12 and 13 respectively designate left-front, right-front, left-rear and right-rear corners of the rack system 1. While the system 1 will be described in detail below, it generally comprises a first polygonal frame assembly 2 serving as a base, and a second identical frame assembly 2' serving as a top, a first vertical support assembly 4, a second vertical support assembly 4' and a plurality of support posts 8.

The first vertical support assembly 4 is disposed on one side of the rack system 1, and the second opposing vertical support assembly 4' is disposed in mirror-image relationship, on the opposite side of the rack system 1. The vertical support assemblies 4,4' are fabricated to include a plurality of spaced horizontal support brackets or rails 30, 32 and 34 for supporting, for example, baking pans (not shown), or the like between the two opposing vertical support assemblies. A pair of spaced vertical stop rods 52 are provided in the vertical support assemblies 4,4' to prevent the baking pans from slipping off the support brackets 30, 32. Projecting end portions of a plurality of spaced vertical support rods 42, 44 and 46 provided at each corner of the vertical support assemblies 4,4' engage and interlock with side trusses and certain cross braces of the base and top frame assemblies 2,2' respectively, of the rack system 1 with an interference-fit or friction-fit.

A frustoconical collar 6 of the type described in U.S. Pat. Nos. 3,523,508 and 3,757,705 (both to Maslow), which are incorporated herein by reference, is provided at each corner of the base and top frame assemblies 2,2'. Each collar 6 receives a split frustoconical sleeve 6', also of the type described in the Maslow Patents, that may be removably secured to a support post 8. Thus the support posts can support the frame assemblies through the intermediary of the split sleeves as described in those patents. If desired, casters 7 or levelling devices (not shown in FIG. 1) may be attached to the support posts 8 to facilitate the positioning of the rack system 1.

Figure 2:
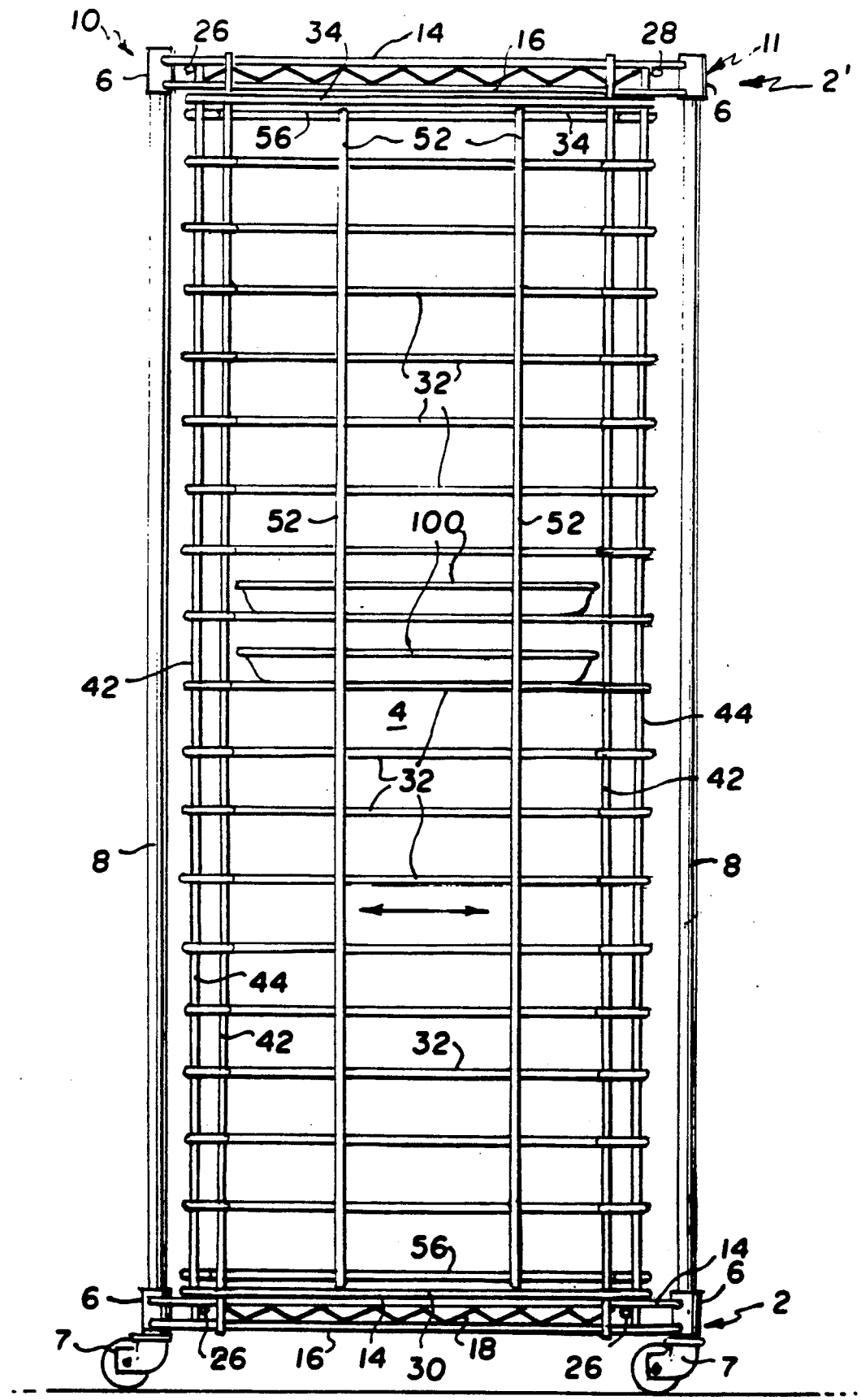
FIG. 2 is an outside, front elevational view of the assembled rack system shown in FIG. 1.

FIG. 2 shows a front of the rack system 1 as viewed from the outside of the vertical support assembly 4 toward the interior of the system in the direction of vertical support assembly 4'. Since the vertical support assembly 4' is identical to the vertical support assembly 4 and is positioned in mirror-image relation to the support assembly 4, the view from the other side of the rack system 1 is substantially identical. Baking pans 100 are removably supported on the inwardly directed support rails 30, 32 between the vertical support assemblies 4, 4' and may be inserted and removed in the direction shown by the two-directional arrow. Since vertical support assembly 4' is identical to vertical support assembly 4, only the former will be described in the interest of simplicity.

At each bottom corner of the vertical support assembly 4, it will be seen that a projecting portion at each end of vertical support rods 42 extends alongside an outboard side of an upper rib 14 and lower rib 16 of frame assemblies 2,2'. In addition, a projecting portion at each end of vertical support rods 44 extends alongside an inboard side of the upper rib 14, and the lower rib 16, and alongside an outboard side of cross braces 26 of frame assemblies 2,2' shown in FIG. 2 and 4. Projecting portions at each end of vertical support rods 46 also engage cross braces 26 but cannot be seen in FIG. 2. The combination of these projecting end portions of the vertical support rods 42, 44 and 46 with ribs 14 and 16 and cross braces 26 provide an interference fit of the vertical support assemblies 4, 4' with frame assemblies 2,2'.

Figure 3:
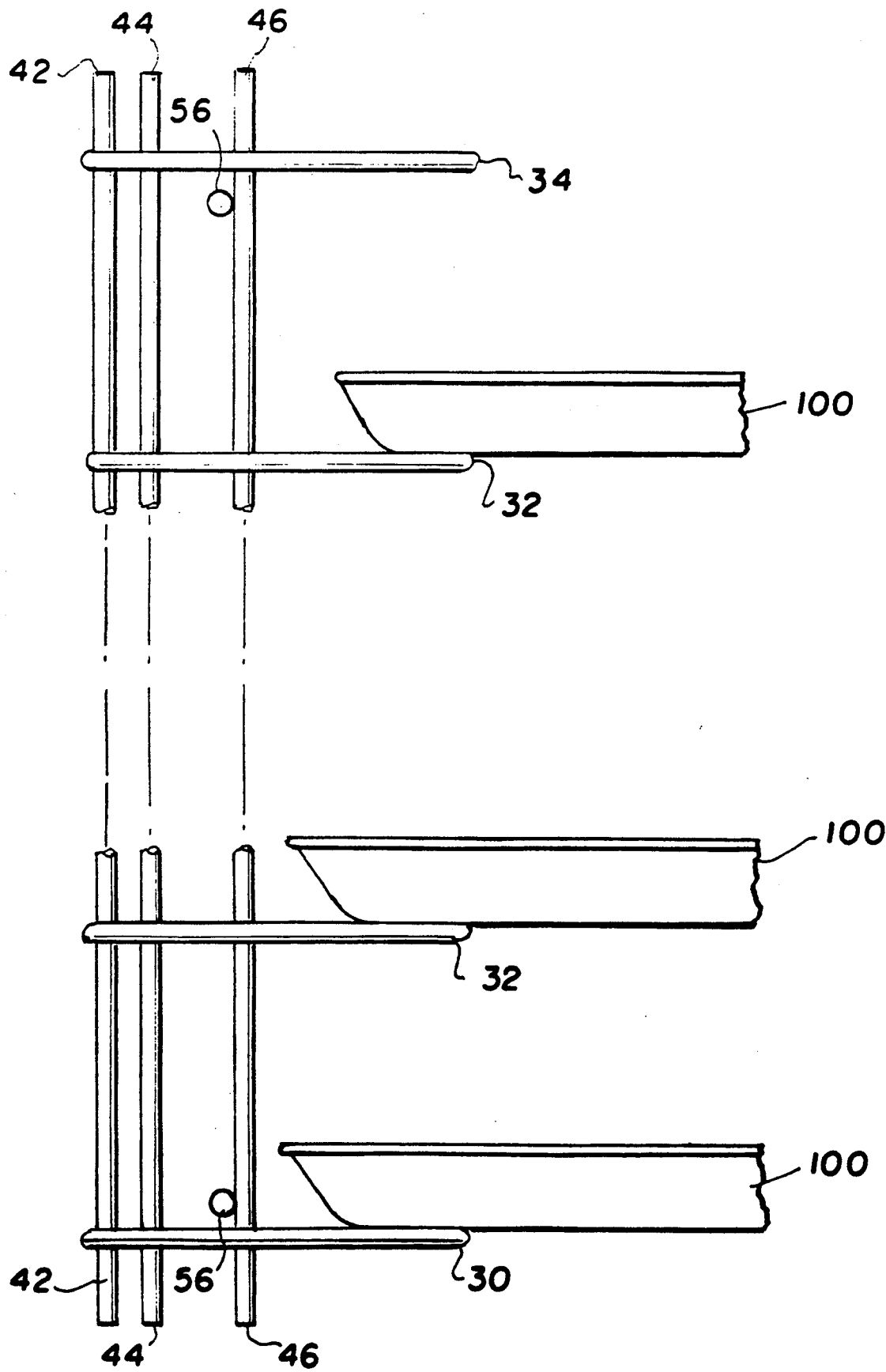
FIG. 3 is a fragmented, right-side elevational view of a vertical support assembly including a plurality of horizontal support brackets with several baking pans supported thereon, used in the rack system shown in FIG. 1.

FIG. 3 shows a fragmented, right side elevational view of the vertical support assembly 4 including horizontal support brackets 30, 32 and 34 which are welded at the points at which they intersect vertical support rods 42, 44 and 46. Horizontal rods 56, shown in section, comprise components of the pan stop assembly 5, which will be discussed later in detail. A number of baking pans 100 are removably supported on support brackets 30 and 32.

Referring now more specifically to FIGS. 4 through 7, in a preferred embodiment of the invention, both frame assemblies 2,2' are generally rectangular and have a relatively long dimension running along the front and back, and a relatively short dimension running along the left and right sides of the rack system 1. A typical frame assembly may be approximately 26½"×21"×1½". Of course, many other sizes are possible. The rectangular shape is advantageous since readily available, commercial baking pans also are generally rectangular in shape. Other shapes of rack systems, such as trapezoidal, triangular, and the like, also are possible. However, the use of such shapes would require the use of similarly shaped baking pans which may have to be custom made and which likely would be more expensive than the rectangular-shaped pans.

As noted, both frame assemblies 2,2' have a frustoconical collar 6 disposed at each corner. Each of the collars 6 is arranged so as to taper outwardly toward its lower extremity when the rack system 1 is positioned in normal use. The collars 6 may be fabricated from cold rolled steel or stainless steel although any formable metal may be used. Two pairs of cross braces 26, 28 and a pair of V-shaped braces 27 are provided to stiffen each of the frame assemblies 2,2' Four snake-like trusses, along with the collars 6, define the perimeter of the frame assemblies 2,2'.

Figure 4:
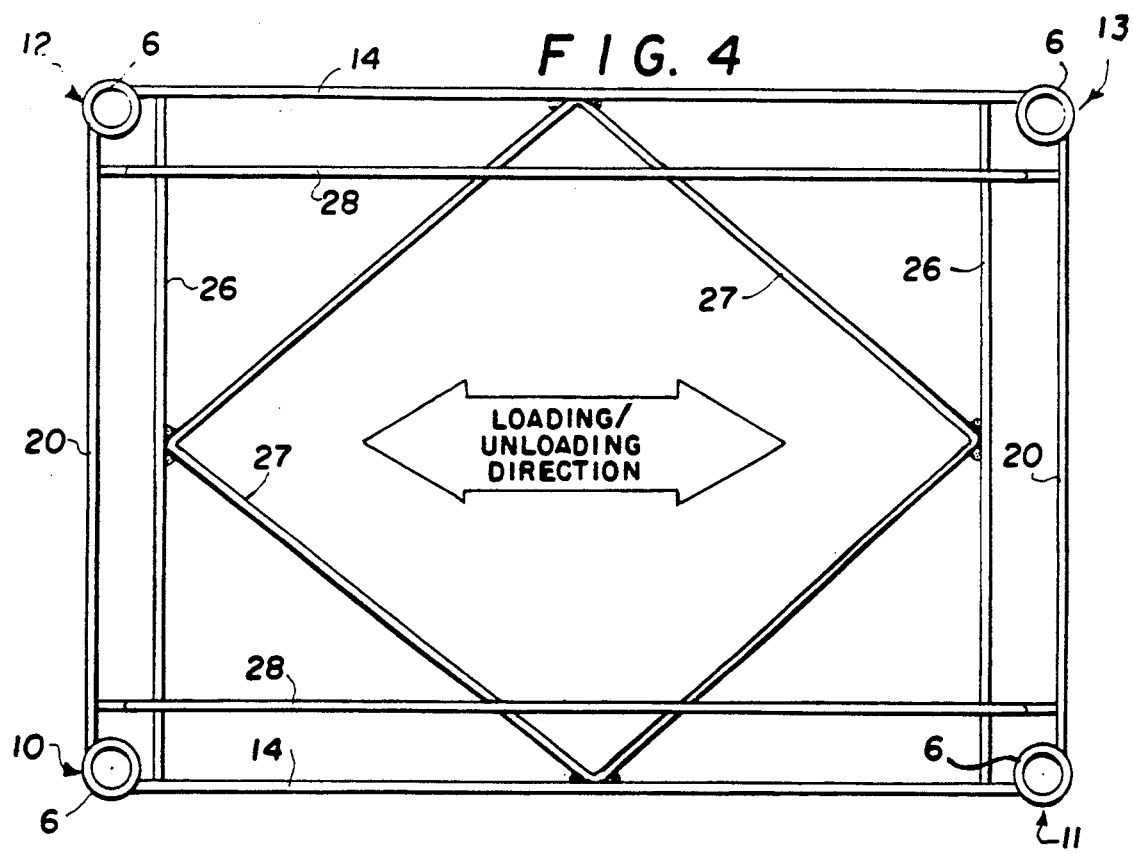
FIG. 4 is a top plan view of a frame assembly, used in pairs as a base and a top, respectively, of the rack system shown in FIG. 1.

The two-directional arrow shown in FIG. 4 illustrates the baking pan loading and unloading directions for an end-loading rack system.

Figure 5:
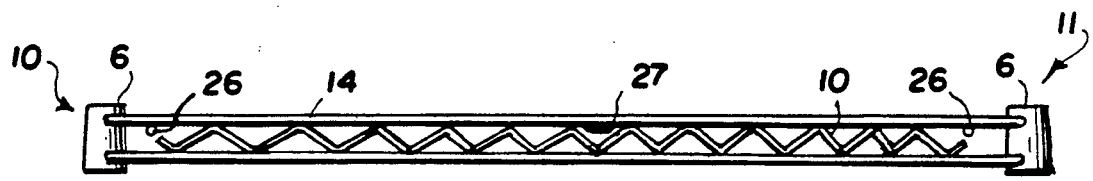
FIG. 5 is a front elevational view of the frame assembly shown in FIG. 4.

With reference to FIG. 5, a first pair of the snake trusses which form the front and back of the frame assemblies 2, 2' now will be discussed. The upper rib 14 and an equal length lower rib 16, formed, for example, from ¼ inch bright basic steel (B.B.S.) wire are welded at both ends to the collars 6 at the left-front corner 10 and the right-front corner 11. A continuous, snake-like rib 18 formed, for example, from number 7 American Wire Gage (AWG) B.B.S. wire is sized so as to fit between the upper and lower ribs 14 and 16 and is welded at the points where it comes in contact with the upper and lower ribs. Of course, many other wire sizes may be used to form the snake trusses depending on material cost, availability, the intended loading of the rack system, etc.

Resistance welding preferably may be used to attach the several components of the rack system. Other forms of attaching the components may be used, such as oxyacetylene gas welding, brazing, and the like. However, resistance welding is fast and very strong, and it does not greatly upset the work which results in readily made, very secure, smooth weld connections. Moreover, resistance welding is especially well suited to connect intersecting wire rods. However, in some instances, such as where the ribs are secured to the collars 6, other-forms of welding may be preferred to provide a smooth contour at the weld joint.

The snake trusses function as stiffener trusses at the front and back of the frame assemblies 2,2', respectively.

Figure 6:
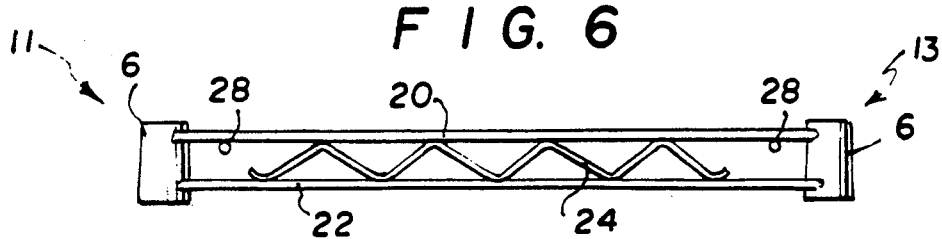
FIG. 6 is a right-side elevational view of the frame assembly shown in FIG. 4.

Next, a second pair of snake-like trusses which form the left side and the right side of frame assemblies 2,2' will be discussed with reference to FIG. 6. Each of the second pair of snake trusses comprises an upper rib 20 and an equal length, lower rib 22, both being somewhat shorter than upper and lower ribs 14 and 16, respectively. Ribs 20 and 22 also are preferably made of ¼ inch wire and are welded to the collars 6 substantially perpendicular to upper and lower ribs 14 and 16. Another continuous snake-like rib 24, also preferably made of number 7 AWG B.B.S. wire, is sized to fit between the upper rib 20 and lower rib 22 and is welded at the points where it comes in contact with the upper and lower ribs. Again, of course, many other wire sizes may be used to form the above-mentioned components as circumstances require.

This pair of snake trusses also function as stiffener trusses at the left and right sides of the frame assemblies 2,2', respectively.

Thus, the front and back snake trusses are disposed substantially perpendicular to the left and right side snake trusses and in cooperation with the collars 6 at the vertices, define the perimeter of the frame assemblies 2,2'.

Again referring to FIG. 4, a first pair of frame assembly cross braces 26, also preferably formed of ¼ inch B.B.S. wire, are disposed substantially perpendicular to the front and back snake trusses. The cross braces 26 are welded to the underside of the upper ribs 14 at the points where they intersect each other.

A second pair of frame assembly cross braces 28, also preferably formed of ¼ inch B.B.S. wire, are welded to the underside of upper ribs 20 at the points where they intersect each other.

Figure 7:
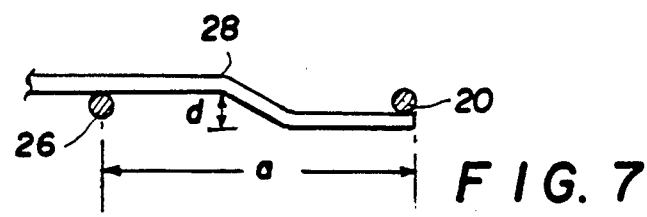
FIG. 7 is a fragmented, partial-sectional view illustrating a detail of the frame assembly shown in FIG. 4.

As shown in FIG. 7, the cross braces 28 are offset by an amount "d", which is approximately equal to the diameter of the wire used for cross braces 26, at a distance "a" approximately 3 inches from each end of cross braces 14. Cross braces 26 are disposed at a distance "b" approximately 1½ inches from each end of cross braces 28. The offset allows the cross braces 28 to be secured to the underside of upper ribs 20 and still clear the top of cross braces 26. In addition, the offset ensures that the middle portions of the cross braces 28 are substantially co-planer with the upper ribs 14 of the frame assemblies 2,2'. The bottom of the cross braces 28 are welded to the top of the cross braces 26 at the points where they intersect each other in order to increase the rigidity of the frame assemblies 2,2'.

In addition, the pair of V-shaped braces 27 are welded at two points near their respective vertices at the points where they intersect the underside of the upper ribs 14. The V-shaped braces 22 are welded at the ends of their respective legs to the underside of the cross braces 26 at the points where they intersect each other. To further stabilize the frame assembly 2,2', the tops of the V-shaped braces 27 also are welded at the points where they intersect the underside of the cross braces 28.

As illustrated in the drawing figures, the rack system 1 is adapted for "end loading". Stated differently, removable pans 100, trays, and the like, may be inserted or removed from both the right and left sides of the rack system 1 as suggested by the bidirectional arrow. Alternatively, the rack system also may be arranged as a "front loading" unit, that is as a rack system which permits insertion and removal of the baking pans 100 from the front and back. To effect such an arrangement, the vertical support assemblies 4,4' are disposed so as to engage and interlock with the left and right sides of the frame assembly. Cross braces 28 must be offset to clear cross braces 26. Similarly, the welding points of cross braces 26, 28 and V-shaped braces 27 will change accordingly.

As noted above, the top frame assembly 2, is identical to base frame assembly 2. Consequently, its construction need not be separately discussed.

Figure 8:
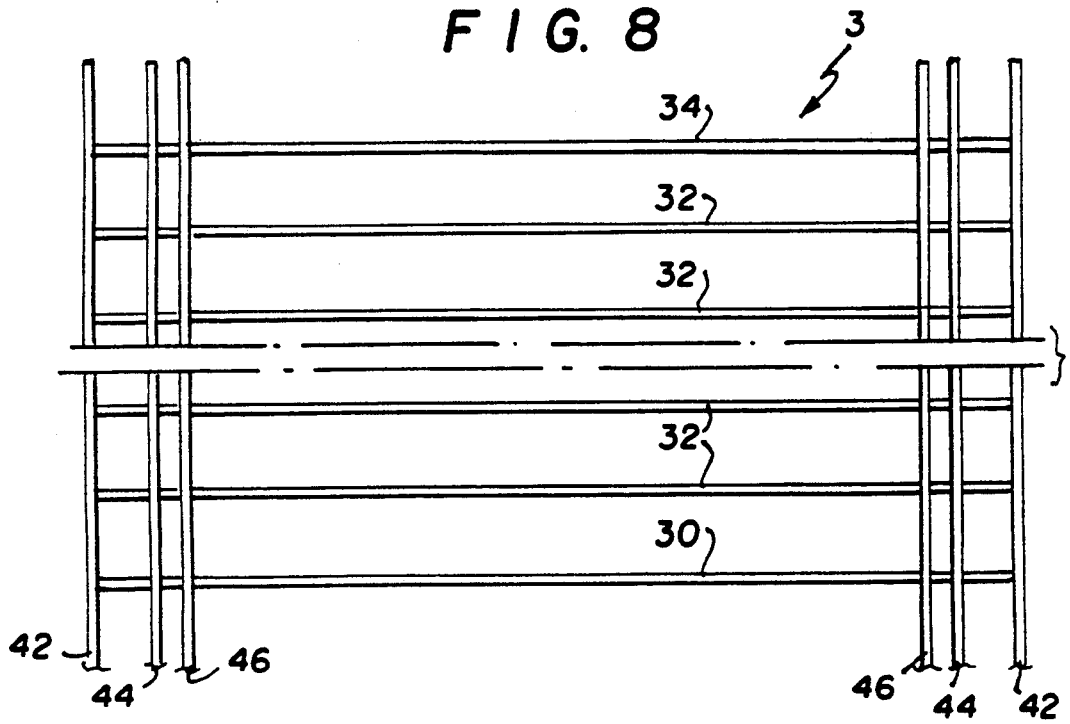
FIG. 8 is a view of a mat assembly which, when properly bent, forms a support rack that is a major component of the vertical support assembly of the rack system shown in FIG. 1.

FIG. 8 illustrates a view of a mat assembly blank from which a horizontal pan support rack 3 maybe fabricated. The term "blank" means that the figure shows the component prior to final bending during its fabrication. In other words, it shows the horizontal pan support rack 3 in a substantially flat state. Subsequent figures of the drawing illustrate the final shape of the horizontal pan support rack 3 after being properly bent. Each vertical support assembly 4 and 4' is made up of a properly bent horizontal pan support rack 3 and a pan stop 5 assembly to be discussed in greater detail hereinbelow.

Each horizontal pan support rack 3 comprises a plurality of spaced horizontal support brackets or rails, including a base support bracket 30, a plurality of intermediate support brackets 32, and a top support bracket 34. The support brackets 30, 32 and 34 are identical but for their position in the rack system 1. In a preferred embodiment, the support brackets are formed of number 7 AWG B.B.S. wire. In addition, each horizontal pan support rack 3 comprises a plurality of spaced vertical support rods 42, 44 and 46, which are also identical but for their position in the rack system. Preferably, the vertical support rods 42, 44 and 46 are formed of ¼ inch B.B.S. wire. The support brackets 30, 32 and 34 are welded near their respective end portions at the points where they intersect the vertical support rods 42, 44 and 46.

In a typical configuration, twenty support brackets are arranged in parallel, approximately 3 1/32 inches on center, resulting in a horizontal pan support rack 3 having nineteen baking pan spaces, and standing approximately five feet tall.

The vertical support rods 42 and 44 are disposed such that when the horizontal pan support rack 3 is properly formed, end portions of the vertical support rods will engage and interlock with inboard and outboard surfaces of portions of the upper and lower ribs 14 and 16 of the front and back snake trusses of the frame assemblies 2,2' for an end loading rack system. Alternatively, the end portions of vertical support rods 42 and 44 may be disposed to engage inside and outside surfaces of portions of the upper and lower ribs 20 and 22, respectively, of the left and right trusses of base and top frame assemblies 2,2' for a front loading rack system.

It will be understood that the dimensions of the base and top frame assemblies and vertical support assemblies must be such so as to allow proper engagement as described herein. The width of the vertical support assemblies 4,4' is generally sized to be approximately equal to the dimension defined by the length of the cross braces 28 between the cross braces 26 for an end loading unit, or the dimension defined by the length of the cross braces 26 extending between the cross braces 28 for a front loading unit.

Figure 9:
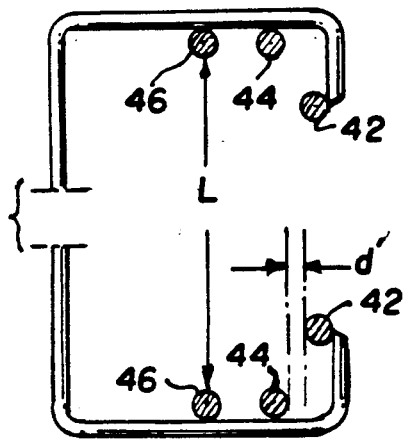
FIG. 9 is a fragmented, top plan view of the mat assembly shown in FIG. 8 after being properly bent to form a support rack.

FIG. 9 shows a fragmented top view of a mat assembly after it has been formed into a horizontal pan support rack 3, being generally C-shaped and having a short turned-in portion at either end.

Square bends are used to form each corner of the support brackets 30, 32 and 34 such that they are generally rectangular.

FIGS. 10 and 11 show the positional relationship of one end of horizontal pan support rack 3 and a left-front corner 10 of the base frame assembly 2. Projecting portions of the vertical rods 42 and 44 extend on opposite sides of a portion of the front snake truss formed by the upper rib 14, the lower rib 16 and the snake-like rib 18. The spacing between the vertical rods 42 and 44 is substantially equal to the diameter of the upper and lower ribs 14,16. Thus, a snug or embracing engagement with the front snake truss of the base assembly 2 is established. A similar arrangement is established at the other end of the horizontal pan support rack 3 with respect to another section of the front snake truss of the base assembly 2. Consequently, movement in a first direction, of the vertical assembly 4 relative to the frame assembly 2 is restricted.

The projecting portions of vertical rods 46 together with the projecting portions of rods 44 are disposed outbound of frame cross braces 26 at each side of the base frame assembly 2. The bottom support bracket 30 is arranged such that the distance "c" shown in FIG. 9 between rods 44 and 46 on opposite ends of the vertical support structure is substantially equal to the distance between the cross braces 26 plus an amount equal to two diameters of the wire used to form the cross braces 26. Thus, a snug or embracing fit is formed around frame cross braces 26. A similar arrangement, in mirror-image is established at the other end of the horizontal support pan support rack 3. Consequently, movement of the vertical support assembly 4 is restricted relative to the base frame assembly 2 in a second direction substantially perpendicular to the first direction. In addition, the bottom of support bracket 30 is supported in the vertical direction by the top of upper rib 14 and cross braces 28.

The top frame assembly 2' is arranged relative to the vertical assemblies 4,4' in a manner substantially similar to that of the base frame assembly 2. However, when the top frame assembly 2' engages the vertical support assemblies 4,4', the lower rail 16 of the top frame assembly 2' captures the top surface of support bracket 34 in the vertical direction.

The other corners 11, 12 and 13 of the base and top frame assemblies engage the vertical support structures in a manner similar to that shown in FIGS. 10 and 11 for the left-front corner 10, and need not be individually discussed.

FIG. 12 shows a pan stop assembly 5 comprising a plurality of spaced vertical stop rods 52 and a plurality of spaced horizontal stiffener rods 56, all formed, for example, of ¼ inch B.B.S. wire. Each end of the horizontal stiffener rods 56 is welded to the vertical support rods 46 of the lateral pan support rack 3, which are shown by phantom lines. When a pair of pan stop assemblies 5 is welded, respectively, to a pair of horizontal pan support racks, they form a pair of vertical support structures 4, 4'. The pan stop assembly 5 prevents the baking pans 100 which are placed on the support brackets 30, 32 from slipping through the front and back of the rack system 1 in an end-loading arrangement. Similarly, when a pair of the pan stop assemblies 5 and vertical support structures 4,4' are disposed on the left and right sides of the rack system 1, the baking pans 100 will be prevented from slipping from a front-loading arrangement.

The pan stop assemblies 5 also add rigidity to the rack system 1, and in particular to the vertical support assemblies 4,4'.

FIG. 14 shows a fragmented support post 8. As noted generally above, a plurality of circumferential grooves 62 are formed at each end of the support post 8. These grooves are provided to receive the ribs formed on an inside surface of a supporting frusto-conical sleeve (not shown in FIG. 4) such as that described in U.S. Pat. Nos. 3,523,508 and 3,757,705. (Both to Maslow), which is also incorporated herein by reference.

In addition, a plurality of grooves 66 are formed approximately in the middle of each of the supporting posts 8. These middle grooves 66 are generally cosmetic and are not necessary to the construction of the invention. However, they do serve as a convenient indication of the approximate center of balance of the unloaded rack system 1. In addition, they provide a better grip for positioning the rack system 1. Both of these aspects facilitate moving the rack system 1.

The support posts 8 are generally hollow and are typically made of metal, most preferably bright zinc plated cold-rolled steel or stainless steel sheet. These compositions are relatively lightweight, provide high structural rigidity, and are inexpensive to manufacture by known metal forming methods. Further, these materials are resistant to corrosion and are easily cleaned. Still further, the grooves 62 and 66 may be efficiently formed therein, using known metal forming methods such as rolling.

Alternatively, the support posts 8 may be made of any conventional material which can be formed to define the above features, particularly including materials such as plastics. Such alternative materials may be well suited to particular rack system applications. Further, the support posts 8 may be solid.

Figure 15:
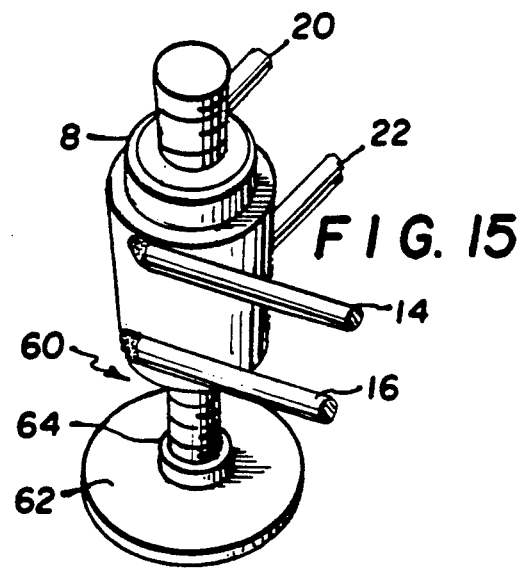
FIG. 15 is a fragmented, perspective view of a corner of the frame assembly shown in FIG. 4 and the support post shown in FIG. 14 with a leveling device inserted therein.

FIG. 15 illustrates another embodiment of the rack system featuring a vertically adjustable leveling assembly 60 shown at the left-front corner assembly 10 of the rack system 1. The leveling assembly 60 comprises a foot portion 62 and a threaded portion 64. The threaded portion 64 engages a thread-receiving portion (not shown) which is secured, or otherwise formed, in an end of each support post 8 which is inserted in a collar 6 of the base and top frame assemblies 2,2'.

In order to assemble the rack system, four support posts are first each equipped with one frustoconical sleeve 6' that collectively are located on the posts at uniform height. Then the bottom frame assembly 2 is mounted on the four posts with a collar 6 at each corner of the frame assembly receiving one sleeve. The projecting portions of the vertical support rods 42, 44 and 46 of one end of a first vertical support assembly 4 are positioned so as to engage the appropriate snake truss and cross brace of the bottom frame assembly. When done properly, the projecting portions of the vertical rods 42, 44, 46 at each end of the first vertical support assembly will hold the vertical support assembly in a vertical position when the bottom frame assembly 2 is supported through the collars and sleeves on the four support posts. The second vertical support assembly 4' is positioned so as to engage an opposing side of the bottom frame assembly 2 and it too will be maintained in an upright position. Next sleeves are mounted at the tops of each of the posts again collectively at a uniform height in the region where the top frame assembly 2' is to be mounted. Then the top frame assembly 2' is positioned over the top of the two vertical front assemblies 4,4' with its respective collars receiving the associated sleeves so that the top frame assembly can be pressed down on the top projecting portions of the vertical rods 42, 44 and 46 to capture them. When so assembled, the vertical frame assemblies 4,4' are restricted from movement relative to the frame assemblies 2,2' in two directions as the result of the interlocking arrangement of projecting portions of the vertical rods, snake trusses and cross braces. At this point, the rack system is capable of maintaining a free-standing state.

If desired, casters 7 or leveling assemblies 60 can be secured in the bottom of each support post 8.

The rigidity of the rack system 1 is increased by inserting downward pressure on the base and top frame assemblies 2,2'. As noted previously, the load on the rack system in normal use also adds to the rigidity and stability of the rack system. The system 1, thus configured, is now ready to be positioned and to receive one or more baking pans 100 which will be supported at each end by the top surface of common-height pairs of the brackets 30, 32 between the vertical support assemblies 4, 4'.

While corner post, shelf collar, and sleeve configurations such as are shown in U.S. Pat. Nos. 3,523,508 and 3,757,705 have been described in connection with one preferred embodiment, other corner post configurations adapted to support the top and bottom frames may be provided.

It will be appreciated that the present invention provides many improvements over known shelving systems in that it is particularly well adapted to support pans or trays in a convenient, low cost manner.

Thus, what has been described is an inexpensive, stable, light-weight vertical rack apparatus capable of bearing a great deal of weight, and capable of being very easily assembled. Those having skill in this field will readily appreciate the economic advantages accruing to such a design.

Of course, all specific shapes, dimensions, wire sizes and materials mentioned herein are provided by way of example only. Rack systems fabricated in shapes, dimensions and using different wire sizes and materials other than those discussed herein also are contemplated.

Although specific embodiments of the present invention have been described above in detail, it will be understood that this description is merely for purposes of explanation. Various modifications of and equivalent structures corresponding to the disclosed aspects of the preferred embodiments in addition to those described above may be made by those skilled in the art without departing from the spirit of the present invention which is defined in the following claims, the scope of which is to be accorded the broadest interpretation so as to encompass all such modifications and equivalent structures.

What is claimed is:

1. A rack system, comprising:
   a horizontal base frame assembly;
   a horizontal top frame assembly; and
   a pair of opposed vertical support assemblies, each of said pair of vertical support assemblies comprising a plurality of spaced support rods, said support rods being solid and substantially circular in cross section, and a plurality of spaced support brackets being secured to said support rods at points where said support brackets intersect said support rods, at least two of said support rods engaging and interlocking with said base frame assembly and with said top frame assembly such that each of said pair of vertical support assemblies is restricted from movement relative to said base frame assembly and said top frame assembly in first and second directions;
   said plurality of support brackets thereby being arranged in substantially co-planar facing pairs to support at least one removable pan between said pairs of vertical support assemblies.

2. A rack system, comprising:
   a horizontal base frame assembly:
   a horizontal top frame assembly;
   a pair of opposed vertical support assemblies, each of said pair of vertical support assemblies comprising a plurality of spaced support rods and a plurality of spaced support brackets being secured to said support rods at points where said support brackets intersect said support rods, at least two of said support rods engaging and interlocking with said base frame assembly and with said top frame assembly such that each of said pair of vertical support assemblies is restricted from movement relative to said base frame assembly and said top frame assembly in first and second directions;
   said plurality of support brackets thereby being arranged in substantially co-planar facing pairs to support at least one removable pan between said pairs of vertical support assemblies; and
   a plurality of support posts disposed between and removably secured to said base frame assembly and said top frame assembly so as to further restrict relative movement therebetween.

3. The rack system according to claim 2, wherein each of said pair of vertical support assemblies further includes a pan stop assembly comprising:
   a plurality of spaced stiffener rods; and
   a plurality of spaced pan stop rods being secured to said plurality of stiffener rods at the points of intersection therebetween.

4. The rack system according to claim 3, wherein said plurality of stiffener rods is disposed horizontally and said plurality of pan stop rods are disposed vertically and substantially perpendicular to said plurality of stiffener rods.

5. The rack system according to claim 4, wherein said stiffener rods and said pan stop rods are welded at the points of intersection.

6. The rack system according to claim 2, wherein said base frame assembly and said top frame assembly are like-shaped polygons.

7. The rack system according to claim 6, wherein said base frame assembly and said top frame assembly are both rectangular.

8. The rack system according to claim 6, wherein said base frame assembly and said top frame assembly each comprises a plurality of trusses and a plurality of collars with a collar being located in each corner of said polygonal base frame assembly and said polygonal top frame assembly, said plurality of trusses being secured to said collars.

9. The rack system according to claim 8, wherein each of said plurality of trusses comprises an upper rib and a lower rib.

10. The rack system according to claim 9, wherein each of said plurality of trusses is secured to selected ones said plurality of collars by welding to form the shape of the base frame assembly and the top frame assembly.

11. The rack system according to claim 10, wherein each of said plurality of trusses further comprises a snake-like stiffening rib disposed between and secured to said upper rib and said lower rib at the points where said snake-like stiffening rib contacts said upper rib and said lower rib.

12. The rack system according to claim 11, wherein each of said snake-like stiffening ribs is secured to said upper rib and said lower rib by welding.

13. The rack system according to claim 8, wherein each of said base frame assembly and said top frame assembly further comprises a first pair of cross braces secured at each end to a first opposing pair of said plurality of trusses.

14. The rack system according to claim 13, wherein each of said base frame assembly and said top frame assembly further comprises a second pair of cross braces secured at each end to a second opposing pair of said plurality of trusses, wherein said second pair of cross braces is disposed substantially perpendicular to said first pair of cross braces.

15. The rack system according to claim 14, wherein said first pair of cross braces is welded to said upper rib of each of said first opposing pair of said plurality of trusses.

16. The rack system according to claim 15, wherein said second pair of cross braces is welded to said upper rib of each of said second opposing pair of said plurality trusses and welded to said first pair of cross braces at the points where they intersect each other.

17. The rack system according to claim 16, wherein said base frame assembly and said top frame assembly each further comprises a first V-shaped brace secured at its vertex to said upper rib of one of said plurality of trusses of said first opposing pair of said plurality of trusses and at its distal ends to said second pair of opposing cross braces at the points where they intersect each other.

18. The rack system according to claim 17, wherein said base frame assembly and said top frame assembly each further comprises a second V-shaped brace secured at its vertex to said upper rib of the other of said plurality of trusses of said first opposing pairs of said trusses and at its distal ends to said second pair of cross braces at the point where they intersect each other.

19. The rack system according to claim 14, wherein said first pair of cross braces comprises offset portions to allow said first pair of cross braces to pass over said second pair of cross braces such that said first pair of cross braces is substantially coplanar with said upper rib of each of said first opposing pair of said plurality of trusses.

20. The rack system according to claim 1, wherein each of said base frame assembly and said top frame assembly comprises:
a plurality of trusses and a plurality of collars with the collar being located in each corner of said base frame assembly and said top frame assembly, and wherein said plurality of trusses are secured to said collars;
a first pair of cross braces secured at each end to a first opposing pair of said plurality of trusses; and
a second pair of cross braces secured at each end to a second opposing pair of said plurality of trusses, wherein said second pair of cross braces is disposed substantially perpendicular to said first pair of cross braces.

21. The rack system according to claim 20, wherein each of said pair of opposed vertical support assemblies comprises a first set of three of said plurality of spaced support rods, and a second set of three of said plurality of spaced support rods, wherein a first support rod of each set engages an outboard portion of a selected one of said plurality of trusses, a second support rod of each set engages an inboard portion of the selected one of said plurality of trusses and an outboard portion of one of a selected one of the other of said first pair of cross braces of said second pair of cross braces, and a third support rod of each set engages an outboard portion of the selected one of said pair of cross braces.

22. The rack system according to claim 21, wherein said first pair of cross braces is welded to said upper rib of each of said first opposing pair of said plurality of trusses.

23. The rack system according to claim 22, wherein said second pair of cross braces is welded to said upper rib of each of said second opposing pair of said plurality trusses and welded to said first pair of cross braces at the points where they intersect each other.

24. The rack system according to claim 23, wherein each of said base frame assembly and said top frame assembly further comprises a first V-shaped brace secured at its vertex to said upper rib of one of said plurality of trusses of said first opposing pair of said plurality of trusses and at its distal ends to said second pair of opposing cross braces at the points where they intersect each other.

25. The rack system according to claim 24, wherein each of said base frame assembly and said top frame assembly further comprises a second V-shaped brace secured at its vertex to said upper rib of the other of said plurality of trusses of said first opposing pairs of said trusses and at its distal ends to said second pair of cross braces at the point where they intersect each other.

26. The rack system according to claim 25, wherein said first pair of cross braces have offset portions to allow said first pair of cross braces to pass over said second pair of cross braces such that said first pair of cross braces is substantially coplanar with said upper rib of each of said first opposing pair of said plurality of trusses.

27. The rack system according to claim 26, wherein said base frame assembly and said top frame assembly are both rectangular.

28. The rack system according to claim 21, further comprising a caster secured to a bottom of each of said plurality of support posts.

29. The rack system according to claim 21, further comprising a leveling device secured to a bottom of each of said plurality of support posts.

30. The rack system according to claim 2, further comprising a caster secured to a bottom of each of said plurality of support posts.

31. The rack system according to claim 2, further comprising a leveling device secured to a bottom of each of said plurality of support posts.

32. A rack system, comprising:
a horizontal base frame assembly;
a horizontal top frame assembly; and
a pair of opposed vertical support assemblies, each of said pair of vertical support assemblies comprising a plurality of at least four spaced support rods and a plurality of spaced support brackets being secured to said support rods at points where said support brackets intersect said support rods, at least four of said support rods engaging and interlocking with said base frame assembly and with said top frame assembly such that each of said pair of vertical support assemblies is restricted from movement relative to said base frame assembly and said top frame assembly in first and second directions;
said plurality of support brackets thereby being arranged in substantially co-planar facing pairs to support at least one removable pan between said pairs of vertical support assemblies.

33. A rack system according to claim 32 wherein said plurality of at least four spaced support rods is comprised of at least two pairs of support rods and wherein at least two of said pairs engage and interlock with said base frame and said top frame assemblies.

34. A rack system according to claim 33 wherein said base frame and top frame assemblies are placed between the individual support rods making up each pair of at least two of said pairs.

35. A rack system, comprising:
a horizontal base frame assembly;
a horizontal top frame assembly; and
a pair of opposed vertical support assemblies, each of said pair of vertical support assemblies comprising a plurality of spaced support rods and a plurality of spaced support brackets being secured to said support rods at points where said support brackets intersect said support rods, at least two of said support rods detachable engaging and interlocking with said base frame assembly and with said top frame assembly such that each of said pair of vertical support assemblies is restricted from movement relative to said base frame assembly and said top frame assembly in first and second directions;
said plurality of support brackets thereby being arranged in substantially co-planar facing pairs to support at least one removable pan between said pairs of vertical support assemblies.

36. The rack system according to claim 35 wherein said detachable engaging and interlocking is a result of a snug fit between said support rods and said base frame and said top frame.

* * * * *

UNITED STATES PATENT AND TRADEMARK OFFICE
CERTIFICATE OF CORRECTION

PATENT NO. : 5,263,595
DATED : November 23, 1993
INVENTOR(S) : FRANK J. HILSTOLSKY It is certified that error appears in the above-identified patent and that said Letters Patent is hereby corrected as shown below:

On the Title Page, Item [73],

"Metro Industries, Inc." should read
    --Metro Industries, Inc., Reno, Nev.--.

COLUMN 6

Line 26, "other-forms" should read --other forms--.

COLUMN 7

Line 6, "co-planer" should read --co-planar--.

COLUMN 10

Line 26, "Next" should read --Next,--.

COLUMN 11

Line 42, "assembly:" should read --assembly;--.

COLUMN 12

Line 30, "ones" should read --ones of--.

COLUMN 13

Line 48, "plurality" should read --plurality of--.

UNITED STATES PATENT AND TRADEMARK OFFICE
CERTIFICATE OF CORRECTION

PATENT NO. : 5,263,595
DATED : November 23, 1993
INVENTOR(S) : FRANK J. HILSTOLSKY It is certified that error appears in the above-identified patent and that said Letters Patent is hereby corrected as shown below:

COLUMN 14

Line 54, "detachable" should read --detachably--.

Signed and Sealed this

Twelfth Day of July, 1994

BRUCE LEHMAN

*Attest:*

*Attesting Officer*  *Commissioner of Patents and Trademarks*

REEXAMINATION CERTIFICATE (2717th)
United States Patent [19]
Hilstolsky

[11] B1 5,263,595
[45] Certificate Issued Oct. 31, 1995

[54] MODULAR RACK SYSTEM FOR USE WITH REMOVABLE PANS

[75] Inventor: Frank J. Hilstolsky, Dallas, Pa.

[73] Assignee: Metro Industries Inc., Reno, Nev.

Reexamination Request:
No. 90/003,574, Sep. 16, 1994

Reexamination Certificate for:
Patent No.: 5,263,595
Issued: Nov. 23, 1993
Appl. No.: 774,356
Filed: Oct. 10, 1991

Certificate of Correction issued Jul. 12, 1994.

[51] Int. Cl.⁶ .................................................. A47F 5/00
[52] U.S. Cl. ................... 211/126; 211/181; 211/133
[58] Field of Search ........................... 211/126, 181, 211/133, 187

[56] References Cited

U.S. PATENT DOCUMENTS

| | | | |
|---|---|---|---|
| 2,936,077 | 5/1960 | Carpenter | 211/126 |
| 2,959,298 | 11/1960 | Pope | 211/126 |
| 3,138,123 | 6/1964 | Maslow | 108/159 |
| 3,208,408 | 9/1965 | Maslow | 108/148 |
| 3,225,720 | 12/1965 | Maslow | 211/181 X |
| 3,232,442 | 2/1966 | Wilson | 211/181 X |
| 3,252,434 | 5/1966 | Young | 211/181 X |
| 3,316,864 | 5/1967 | Maslow | 108/148 |
| 3,523,508 | 8/1970 | Maslow | 108/144 |
| 3,523,694 | 8/1970 | Oliver | 211/126 X |
| 3,610,429 | 10/1971 | Mackay | 211/133 |
| 3,757,705 | 9/1973 | Maslow | 108/144 |
| 4,004,819 | 1/1977 | Brongo | 280/79.3 |
| 4,629,077 | 12/1986 | Niblock | 211/187 |
| 4,725,066 | 2/1988 | Nootenboom et al. | 211/126 X |
| 4,811,670 | 3/1989 | Kolvites et al. | 108/107 |
| 4,892,044 | 1/1990 | Welsch | 108/154 |
| 4,964,350 | 10/1990 | Kolvites et al. | 108/110 |
| 4,989,519 | 2/1991 | Welsch et al. | 108/111 |

OTHER PUBLICATIONS

Super Erecta Shelf® Slide Inserts, InterMetro Industries Corporation Catalog Sheet 10.12a (1983).

Primary Examiner—Robert W. Gibson, Jr.

[57] ABSTRACT

A rack system includes a horizontal polygonal base frame assembly and an identical horizontal top frame assembly, and a pair of vertical support assemblies, all fabricated from formed wire. The vertical support assemblies include three vertical rods at either end disposed in two planes and a plurality of horizontal support brackets or rails welded thereto at spaced intervals. The vertical rods are positioned such that projecting end portions thereof engage rib and cross brace portions of the base and top frame assemblies to form an interference or friction fit. When so positioned, the vertical support structure is restricted from moving in two perpendicular directions. The two vertical support assemblies are positioned in mirror-image relationship between the base frame assembly and the top frame assembly. The base and top frame assemblies with the two vertical support structures are secured and precluded from moving in a third direction by the interaction of the support posts and top and bottom frame assemblies.

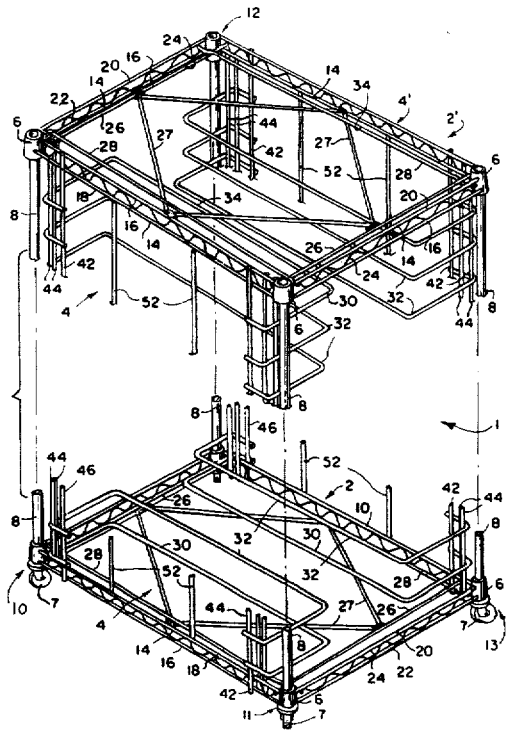

B1 5,263,595

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 6, line 64 through column 7, line 10:

As shown in FIG. 7, the cross braces 28 are offset by an amount "d", which is approximately equal to the diameter of the wire used for cross braces 26, at a distance "a" approximately 3 inches from each end of cross braces 14. Cross braces 26 are disposed at a distance "b" approximately 1½ inches from each end of cross braces 28. The offset allows the cross braces 28 to be secured to the underside of upper ribs 20 and still clear the top of cross braces 26. In addition, the offset ensures that the middle portions of the cross braces 28 are substantially [co-planar] *coplanar* with the upper ribs 14 of the frame assemblies 2,2'. The bottom of the cross braces 28 are welded to the top of the cross braces 26 at the points where they intersect each other in order to increase the rigidity of the frame assemblies 2,2'.

AS A RESULT OF REEXAMINATION, IT HAS BEEN DETERMINED THAT:

The patentability of claims 17–19, 21–29, 34 are confirmed.

Claims 1–16, 20, 30–33, 35–36 are cancelled.

New claims 37–46 are added and determined to be patentable.

*37. A rack system, comprising:*

*a horizontal base frame assembly having at least two edge members at about the periphery thereof, each of said edge members having a first thickness;*

*a horizontal top frame assembly having at least two edge members at about the periphery thereof, each of said edge members having a second thickness; and*

*a pair of opposed vertical support assemblies, each of said pair of vertical support assemblies comprising at least four spaced support rods each having a base end and a top end, and a plurality of spaced support brackets being secured to at least certain of said support rods at points where said support brackets intersect said certain support rods, wherein said support rods terminate at the base ends and at the top ends thereof in projecting portions, at least two of said base end projecting portions being separated by a horizontal distance about equal to or less than said first thickness and said base end projecting portions engaging and interlocking therebetween one of said base frame assembly edge members, at least two of said top end projecting portions being separated by a horizontal distance about equal to or less than said second thickness and said top end projecting portions engaging and interlocking therebetween one of said top frame assembly edge members such that each of said pair of vertical support assemblies is restricted from movement relative to said base frame assembly and said top frame assembly in first and second directions;*

*said plurality of support brackets thereby being arranged in substantially co-planar facing pairs to support at least one removable pan between said pairs of vertical support assemblies.*

*38. The rack system according to claim 37, wherein each of said pair of vertical support assemblies further includes a pan stop assembly comprising:*

*a plurality of spaced stiffener rods; and*

*a plurality of spaced pan stop rods being secured to said plurality of stiffener rods at the points of intersection therebetween.*

*39. The rack system according to claim 38, wherein said plurality of stiffener rods is disposed horizontally and said plurality of pan stop rods are disposed vertically and substantially perpendicular to said plurality of stiffener rods.*

*40. The rack system according to claim 39, wherein said stiffener rods and said pan stop rods are welded at the points of intersection.*

*41. A rack system according to claim 37, wherein said projecting portions engage and interlock about said edge members by means of a snug friction fit.*

*42. A rack system according to claim 37, wherein at least two of said projecting portions are in embracing engagement about said edge members by means of an interference fit.*

*43. The rack system according to claim 37, wherein each of said pair of opposed vertical support assemblies comprises a first set of two of said plurality of spaced support rods, and a second set of two of said plurality of spaced support rods, wherein a base projecting portion of one of said support rods of each set engages an outboard side of a selected one of said base assembly edge members and a base projecting portion of a second support rod of each set engages an inboard side of the selected one of said base assembly edge members.*

*44. A rack system, comprising:*

*a horizontal base frame assembly;*

*a horizontal top frame assembly;*

*a pair of opposed vertical support assemblies, each of said pair of vertical support assemblies comprising a plurality of spaced support rods and a plurality of spaced support brackets being secured to said support rods at points where said support brackets intersect said support rods, wherein said support rods terminate at each end in a substantially straight projecting portion, at least two of said support rods engaging and interlocking with said base frame assembly and with said top frame assembly by means of said straight projecting portions such that each of said pair of vertical support assemblies is restricted from movement relative to said base frame assembly and said top frame assembly in first and second directions;*

*said plurality of support brackets thereby being arranged in substantially co-planar facing pairs to support at least one removable pan between said pairs of vertical support assemblies; and*

*a plurality of support posts disposed between and removably secured to said base frame assembly and said top frame assembly so as to further restrict relative move-* ment therebetween, wherein a top projecting portion of one of said support rods of each set engages an outboard side of a selected one of said top assembly edge members, and a top projecting portion of a second support rod of each set engages an inboard side of the selected one of said top assembly edge members.

45. The rack system according to claim 37, wherein said base frame assembly and said top frame assembly are both rectangular.

46. A rack system, comprising:

a horizontal base frame assembly;

a horizontal top frame assembly; and a pair of opposed vertical support assemblies, each of said pair of vertical support assemblies resting on said base frame assembly and comprising a plurality of at least four spaced support rods and a plurality of spaced support brackets being secured to said support rods at points where said support brackets intersect said support rods, at least four of said support rods engaging and interlocking with said base frame assembly and with said top frame assembly such that each of said pair of vertical support assemblies is substantially prevented from movement relative to said base frame assembly and said top frame assembly in first and second directions;

said plurality of support brackets thereby being arranged in substantially co-planar facing pairs to support at least one removable pan between said pairs of vertical support assemblies, and wherein said plurality of at least four spaced support rods is comprised of at least two pairs of support rods and wherein at least two of said pairs engage and interlock with said base frame and said top frame assemblies, and wherein said base frame and top frame assemblies are placed between the individual support rods making up each pair of at least two of said pairs.

* * * * *